INVENTOR.
HERBERT M. ROBINSON.

2,782,765

AIR CYLINDER

Herbert M. Robinson, Detroit, Mich., assignor to Robinson Products, Inc., Detroit, Mich., a corporation of Michigan Application July 28, 1954, Serial No. 446,239

3 Claims. (Cl. 121—38)

The present invention pertains to a novel air cylinder for the operation of various apparatus such as punches, riveting machines, automotive brakes and the like.

In the invention a piston is actuated by fluid pressure behind it. One of the objects of the invention is to avoid the formation of a solid air cushion in advance of the piston and yet prevent too abrupt stopping of the piston at the end of its forward stroke. Another object is to utilize a portion of the shock absorbing mechanism to retain a seal surrounding the piston rod and holding it against lateral shifting.

In the accomplishment of these objects, the forward end of the cylinder is provided with an adjustable bleeder which prevents the formation of a solid air cushion. On the other hand, in order not to slow down the piston excessively, a rubber or similar shock absorber is carried by the piston rod near its rear end. A coil spring is seated on the shock absorber and supports a stop plate which is thus held against the forward end of the cylinder. The spring-pressed stop plate retains and compresses the sealing member for the piston rod mentioned above. At the end of the forward stroke, the shock absorber strikes against the stop plate, and with the employment of such means, the bleeder may be opened rather widely.

The forward end of the cylinder is also fitted with an inwardly opening check valve to admit air into the cylinder. The piston is pushed back by the spring on release of the operating pressure.

Figure 1:
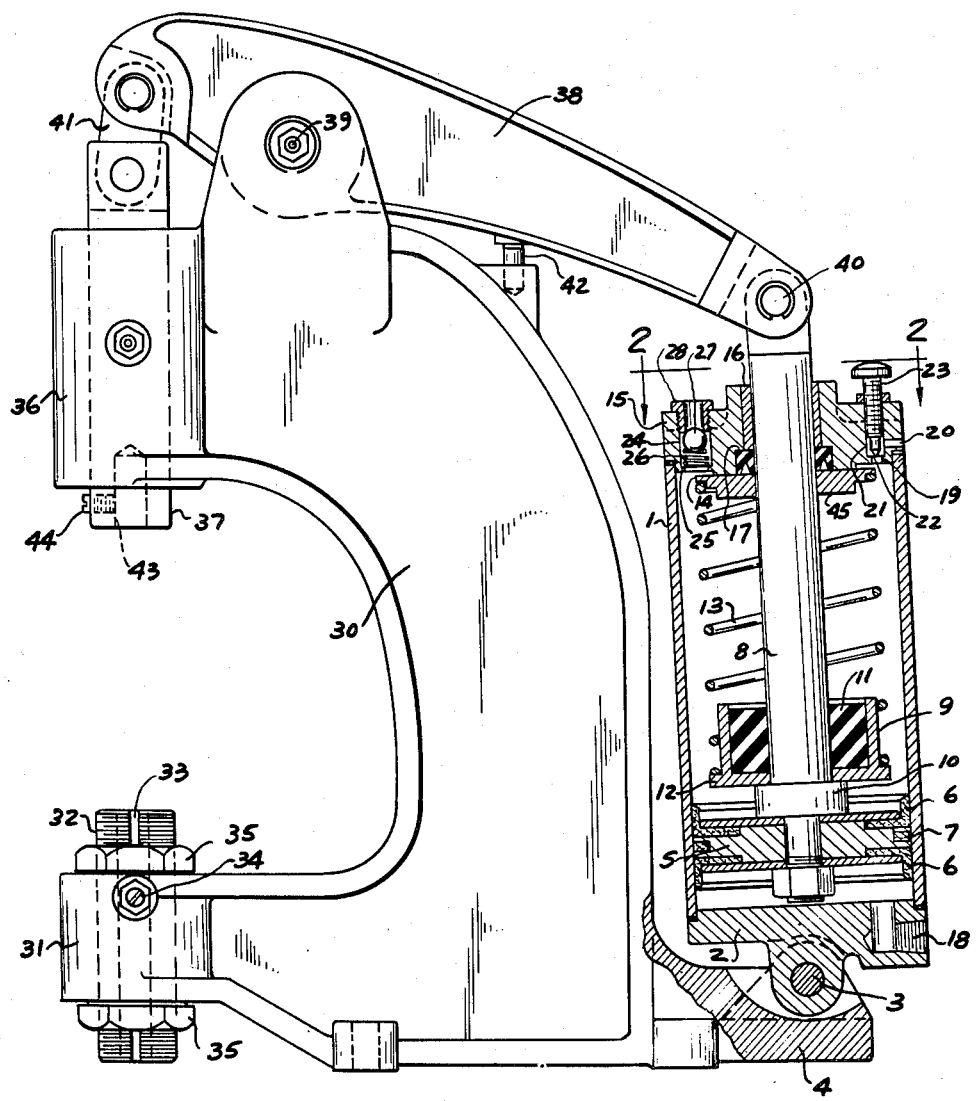
Figure 2:
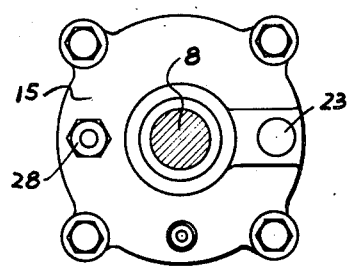

The invention is fully disclosed by way of example in the following description and in the accompanying drawings in which Figure 1 is a vertical elevation of the device, partly in section, and Figure 2 is a section on the line 2—2 of Figure 1.

Reference to these views will now be made by use of like characters which are employed to designate corresponding parts throughout.

In Figure 1 is shown a cylinder 1 having a bottom closure 2 which is pivoted at 3 to a fixed structure 4 presently to be described. In the cylinder is mounted a piston 5 carrying upper and lower leather cups 6 and having a lubricating ring 7.

A piston rod 8 extends upward from the piston 5 and is surrounded by a cup 9 resting on a shoulder 10 of the rod. The cup 9 is packed with a rubber block or cushion 11 for a purpose that will presently be described. The bottom of the cup is formed with an outward flange 12 on which rests a coil spring 13 bearing against a stop plate 14 which also surrounds the piston rod 8.

The upper end of the cylinder is closed by a cap 15 through which the piston rod 8 also passes. A bushing 16 surrounds the piston rod in the cap, and below the bushing is a chevron type seal or gasket 17 of V-section. The stop plate 14 is held by a spring 13 against the cap 15 and in turn holds the seal 17 compressed in the cap, so that no additional retaining means for the seal is required.

The bottom piece 2 is formed with an air inlet 18. As the piston is forced upward under air pressure, an undesirable air cushion would form over the piston unless relieved. On the other hand, it is not desired that the cup 9 strike too sharply against the stop plate 14. To provide for this situation, the cap 15 formed with a port 19 communicating directly with the interior of the cylinder 1 and with a lateral port 20 slightly above the port 19 and communicating with a chamber 21 which also communicates with the port 19 and forms a seat 22. A screw pin 23 is threaded in the chamber 21 from the top of the cap and adjusts the open area of the valve seat 22. This construction constitutes a bleeder for the air cushion over the piston 5.

When the air pressure at intake 18 is released, the spring 13 depresses the piston 5 if there is sufficient venting. To increase the venting over that provided at the seat 22, an inwardly opening check valve is provided. Another chamber 24 is formed in the top 15, with a bottom seat 25 communicating with the cylinder. A spring 26 is mounted on this seat and supports a ball 27. A nut 28 screwed into the chamber 24 from the top of the cap comprises the seat for the ball 27. Reduced pressure in the cylinder on dropping of the piston is sufficient to pull the ball 27 inward against the light spring 26 and thereby admit air from the atmosphere. The described air cylinder may be employed with various apparatus, and in this connection a punch press or riveter is illustrated. This device comprises a U-shaped body 30 carrying the fixed member 4 to which the cylinder 1 is pivotally attached at 3. The bottom jaw 31 of the column 30 constitutes an anvil sleeve 31 in which is mounted a heavy threaded stud 32 constituting the anvil. This member is slotted longitudinally at 33 and guided by a screw 34 in the member 31, and is adjustably locked by nuts 35 at both ends.

In the upper jaw 36 is slidably mounted a push rod 37 directly over the anvil 32. A rocker arm 38 is pivotally mounted at 39 on the top of the column 30 and has one end pivotally connected at 40 to the upper exposed end of the piston rod 8. The other end of the rocker arm is linked at 41 to the upper end of the push rod 37. A suitable stop 42 is formed on the column 30 to limit the downward movement of the actuated end of the rocker arm 38.

The lower end of the push rod 37 is formed with a socket 43 and provided with an adjacent set screw 44 for a punch or riveting tool.

The general operation of the air cylinder has already been described. The lower face of the stop plate 14 is formed with a circular extension 45 of smaller diameter than the inside diameter of the cup 9 and of a sufficient thickness to engage the rubber block 11 which does not fill the cup 9 to the top. On the upward movement of the piston 5, the moving parts are thereby cushioned between the block 11 and the extension 45. Consequently the bleeder pin 23 may be opened rather generously to permit a rapid stroke of the piston and yet without excessive impact.

The device is an air cylinder in the sense that air is admitted to and expelled from the cylinder 1. The medium for applying pressure under the piston 5 through the inlet 18 may be air or liquid. The device may be used with like effectiveness in connection with automotive brakes and other apparatus. It is particularly useful in applying rivets to and removing rivets from brake linings. In all applications, the compressed seal 17 prevents leakage through the bushing 16, and the stop plate 14 also serves as a pilot or retainer for the upper end of the spring 13.

Although a specific embodiment of the invention has been illustrated and described, it will be understood that

What I claim is:

1. In combination, a cylinder having closures at both ends, a piston in said cylinder, a piston rod extending from said piston through one of said closures, fluid intake and exhaust means at the opposite closure, a sealing member for said rod in the first closure, a shock absorber on said piston, a coil spring surrounding said rod and seated on said shock absorber, a stop plate for said shock absorber seated on said spring and bearing against said sealing member, an air inlet through the first closure to said cylinder, means for adjusting said inlet, and an inwardly opening check valve in the first closure for admitting air to said cylinder.

2. In combination, a cylinder having closures at both ends, a piston in said cylinder, a piston rod extending from said piston through one of said closures, fluid intake and exhaust means at the opposite closure, a sealing member for said rod in the first closure, a cup on said piston rod, a coil spring surrounding said rod and seated on said cup, a resilient packing in said cup, a stop plate supported by said spring and bearing against said sealing member and engageable by said packing on compression of said spring, and an air inlet through the first closure to said cylinder, means for adjusting said inlet, and an inwardly opening check valve in the first closure for admitting air to said cylinder.

3. In combination, a cylinder having closures at both ends, a piston in said cylinder, a piston rod extending from said piston through one of said closures, a bushing for said rod in the first closure, a sealing member alined with said bushing and exposed to the interior of said cylinder, a shock absorber on said piston, a coil spring surrounding said rod and seated on said shock absorber, a stop plate for said shock absorber seated on said spring and bearing against said sealing member, an air inlet through the first closure to said cylinder, means for adjusting said inlet, and an inwardly opening check valve in the first closure for admitting air to said cylinder.

References Cited in the file of this patent

UNITED STATES PATENTS

| | | |
|---|---|---|
| 840,876 | Steedman | Jan. 8, 1907 |
| 2,194,732 | Aikman | Mar. 26, 1940 |
| 2,204,672 | Folberth et al. | June 18, 1940 |